(12) United States Patent
Garin et al.

(10) Patent No.: US 10,054,000 B2
(45) Date of Patent: Aug. 21, 2018

(54) TURBINE CASING MADE OF TWO MATERIALS

(71) Applicant: SNECMA, Paris (FR)

(72) Inventors: Fabrice Marcel Noel Garin, Boissise la Bertrand (FR); Florence Valerie Bon, Cesson (FR); Jerome Etienne Robert Cameau, Combs la Ville (FR); Jean-Marc Michel Lesaine, Rubelles (FR); Alain Paul Madec, Chartrettes (FR)

(73) Assignee: SNECMA, Paris (FR)

( * ) Notice: Subject to any disclaimer, the term of this patent is extended or adjusted under 35 U.S.C. 154(b) by 824 days.

(21) Appl. No.: 14/449,308

(22) Filed: Aug. 1, 2014

(65) Prior Publication Data

US 2015/0315926 A1 Nov. 5, 2015

(30) Foreign Application Priority Data

Aug. 7, 2013 (FR) ..................................... 13 57857

(51) Int. Cl.
*F01D 25/24* (2006.01)
*F01D 11/24* (2006.01)
*F01D 11/18* (2006.01)

(52) U.S. Cl.
CPC ............ *F01D 11/24* (2013.01); *F01D 25/246* (2013.01); *F01D 11/18* (2013.01);
(Continued)

(58) Field of Classification Search
CPC .......... F01D 11/00; F01D 11/08; F01D 11/14; F01D 11/18; F01D 11/20; F01D 11/24;
(Continued)

(56) References Cited

U.S. PATENT DOCUMENTS 5,639,210 A * 6/1997 Carpenter ............... F01D 11/18
415/135
8,025,483 B2 9/2011 Blanchard et al.
(Continued)

FOREIGN PATENT DOCUMENTS

EP 2 025 878 A2 2/2009
FR 2 972 483 A1 9/2012

OTHER PUBLICATIONS

French Preliminary Search Report dated Jan. 27, 2014 in French Application 13 57857, filed on Aug. 7, 2013 ( with English Translation of Categories of Cited Documents).
(Continued)

*Primary Examiner* — Justin Seabe
*Assistant Examiner* — Behnoush Haghighian
(74) *Attorney, Agent, or Firm* — Oblon, McClelland, Maier & Neustadt, L.L.P.

(57) ABSTRACT

The invention proposes a casing (30) of an aircraft turbine (16), intended to support a set of ring sectors (28) which partly delimits a channel for the passage of a gas stream through the turbine (16),
where the casing (30) includes means for dynamic adjustment of the radial position of the ring sectors (28) by controlled injection of an air stream on to portions (36) of an annular wall (34) of the casing (30),
where the casing (30) includes an upstream radial tab (38) which connects an upstream end of each ring sector (28), in the flow direction of the gas stream, to the casing (30), and a downstream radial tab (40) which connects a downstream end of each ring sector (28) to the casing (30), where both upstream and downstream radial tabs (38, 40) are made from a single piece with the casing (30),
characterized in that each radial tab (38, 40) is made as two portions (42, 44) from different materials.

8 Claims, 2 Drawing Sheets

(52) U.S. Cl.
CPC .... *F05D 2210/12* (2013.01); *F05D 2220/323* (2013.01); *F05D 2230/642* (2013.01); *F05D 2240/11* (2013.01); *F05D 2240/55* (2013.01); *F05D 2300/174* (2013.01); *F05D 2300/175* (2013.01); *F05D 2300/5021* (2013.01)

(58) Field of Classification Search
CPC .. F01D 25/246; F02C 7/20; F05D 2300/5021; F05D 2300/174; F05D 2300/175
See application file for complete search history.

(56) References Cited

U.S. PATENT DOCUMENTS

| | | | |
|---|---|---|---|
| 8,070,445 | B2 | 12/2011 | Blanchard et al. |
| 8,100,635 | B2* | 1/2012 | Dakowski ............ F01D 11/005 415/115 |
| 8,402,770 | B2 | 3/2013 | Garin et al. |
| 8,651,821 | B2 | 2/2014 | Dao et al. |
| 8,757,966 | B2 | 6/2014 | Blanchard et al. |
| 8,864,458 | B2 | 10/2014 | Blanchard et al. |
| 2004/0071548 | A1* | 4/2004 | Wilson, Jr. ............. F01D 11/18 415/173.1 |
| 2005/0058540 | A1* | 3/2005 | Diakunchak ........... F01D 11/18 415/173.1 |
| 2012/0163957 | A1 | 6/2012 | Moraines et al. |
| 2012/0308391 | A1 | 12/2012 | Garin et al. |
| 2014/0003924 | A1* | 1/2014 | Bonneau ................ F01D 11/24 415/183 |
| 2016/0273376 | A1* | 9/2016 | Rioux .................... F01D 11/18 |

OTHER PUBLICATIONS

U.S. Appl. No. 13/520,433, filed Jul. 3, 2012, 2012-0308391, Garin, et al.

U.S. Appl. No. 14/003,490, filed Sep. 6, 2013, 2014-0003924, Bonneau, et al.

\* cited by examiner

TURBINE CASING MADE OF TWO MATERIALS

TECHNICAL FIELD

The invention proposes a turbomachine casing including means of attaching ring sectors.

More specifically the invention proposes a casing including radial tabs which are designed to tolerate both the thermal stresses arising from the exhaust gases and the stresses relating to the dimensional variations of the casing when controlling the clearance.

STATE OF THE PRIOR ART

In an aircraft turbomachine the radial position of the top of the high-pressure turbine blades varies according to the operating conditions of the turbomachine, notably due to the fact that the blades expand to a greater or lesser extent since they are heated by the combustion gases, and also due to the fact that the speed of rotation of the turbomachine causes a greater or lesser lengthening of the blades by centrifugal action.

The blades of the high-pressure turbine are positioned in a stream of the turbine, which is delimited by an outer ring formed of several adjacent ring sectors. The tops of the blades move close to the inner face of each ring sector.

Since the radial position of the top of each blade varies according to the operating conditions of the turbomachine, the radial clearance between the top of each blade and the ring sectors also varies.

If this clearance is too great a vortex of gases is produced at the top of each blade, which impairs the efficiency of the turbomachine. If this clearance is too small the top of a blade may come into contact with a ring sector and damage it.

Document FR-A-2.972.483 describes a turbomachine casing enabling the radial position of the ring sectors relative to the tops of the blades to be controlled dynamically.

According to this document, each ring sector is supported by an outer casing of the turbomachine which is produced such that it is able to control the extent of this radial clearance.

To accomplish this the casing contains bosses on to which an air stream is projected which is colder than the temperature of the casing, to cool the casing and to cause a radial contraction of the casing. This contraction of the casing leads to a reduction of the diameter of the casing and of the ring, by this means reducing the radial clearance between the tops of the blades and the ring sectors.

The casing is generally called a "control casing".

The connection between the ring sectors and the casing is made through radial tabs which are formed as a single piece with the casing, and are connected to each axial end of the ring sectors.

The quality of the clearance control depends on the material used to form the casing. Indeed, this material must be able to expand or contract with a relatively large amplitude.

However, the radial tabs are subject to substantial thermal stresses at their inner radial ends which are connected to the ring sectors. The material constituting the control casing must consequently also be able to withstand high temperatures, which may be as high as approximately 800° C.

The aim of the invention is to propose a control casing produced as a single piece, which can expand efficiently to accomplish clearance control, and which is able to withstand the thermal stresses at the inner radial ends of the connecting tabs.

DESCRIPTION OF THE INVENTION

The invention proposes an aircraft turbine casing, intended to support a set of ring sectors which partially delimits a channel for the passage of a gas stream through the turbine, where the casing includes means for dynamically adjusting the radial position of the ring sectors through controlled injection of an air stream on portions of an annular wall of the casing, where the casing includes an upstream radial tab which connects an upstream end of each ring sector, in the flow direction end of the gas stream, to the casing, and a downstream radial tab which connects a downstream end of each ring sector to the casing, where the two upstream and downstream radial tabs are manufactured as a single piece with the casing, characterised in that each radial tab is manufactured from two portions of different materials.

By manufacturing the casing from two different materials each portion of the casing can be made appropriately for its function or the stresses to which it is subject.

Each radial tab preferably includes a radially internal portion made of a first material and a radially external portion made of a second material.

The casing's annular wall is preferably made of the said second material.

Both portions of each radial tab are preferably coupled to one another by welding.

The welding bead of both portions of a radial tab is preferably circular and coaxial with the main axis of the casing.

Preferably, the first material is a heat-resistant material, and the second material is a material with a high linear expansion coefficient.

The first material is preferably an alloy of aluminium and titanium known by the designation C263.

The second material is preferably an alloy of nickel and chromium known by the designation "inconel 718".

The invention also proposes an aircraft turbomachine turbine characterised in that it includes a stator assembly consisting of a casing according to the invention, and consisting of multiple ring sectors which are attached directly at least to the upstream radial tab of the casing.

The invention also proposes an aircraft turbomachine including a turbine according to the previous claim and/or a casing according to the invention.

BRIEF DESCRIPTION OF THE ILLUSTRATIONS

Other characteristics and advantages of the invention will come to light on reading the detailed description which follows, for the understanding of which reference will be made to the appended figures, of which:

DETAILED DESCRIPTION OF PARTICULAR EMBODIMENTS

Figure 1:
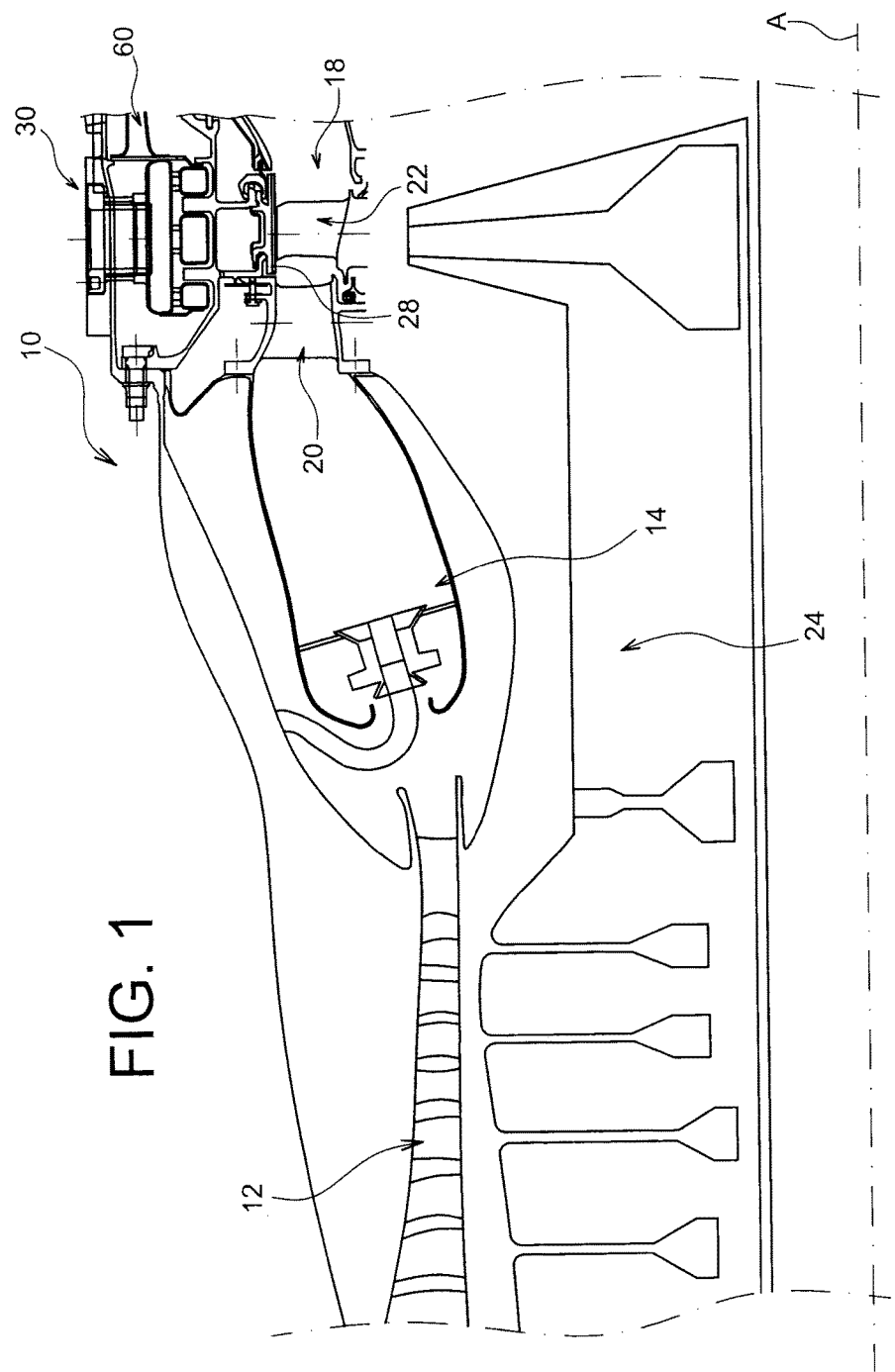
FIG. 1 is a partial axial section view of a turbomachine including a casing produced in accordance with the invention.

In FIG. 1 a turbomachine 10 with a main axis A has been represented, which includes, in succession, in the flow direction of the gas stream, i.e. in this case from left to right, a high-pressure compressor 12, a combustion chamber 14 and a high-pressure turbine 16.

High-pressure turbine 16 includes a ring conduit 18, commonly called a "duct", through which the gases from combustion chamber 14 flow from upstream to downstream, stationary distributors 20 and moving blades 22, which are positioned in duct 18.

Blades 22 are supported by a high-pressure body 24 of high-pressure turbine 16, which rotates around main axis A of turbomachine 10, and connects high-pressure turbine 16 to high-pressure compressor 12.

High-pressure turbine 16 includes a radially external stator assembly, which partially delimits the duct, and which includes multiple adjacent ring sectors 28, which radially delimit duct 18.

Figure 2:
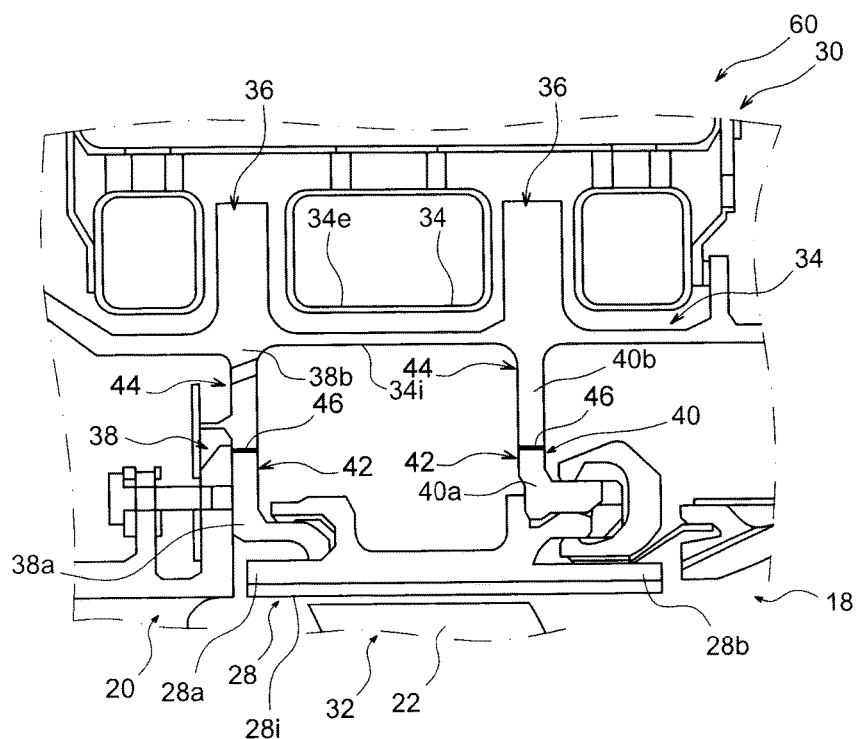
FIG. 2 is a detail on a larger scale of the control casing represented in FIG. 1, showing the structure consisting of two portions of the radial tabs.

The stator assembly also includes an outer casing of high-pressure turbine 16 which supports ring sectors 28, as can be seen in greater detail in FIG. 2.

Casing 30 includes an annular wall 34 located radially at a distance from ring sectors 28 on inner face 34i of which ring sectors 28 are installed.

Casing 30 is also manufactured so as to allow dynamic adjustment of the radial position of ring sectors 28 relative to main axis A of turbomachine 10, to optimise the radial clearance between top 32 of each blade 22 and the opposing inner face 28i of each ring sector 28.

This dynamic adjustment is accomplished according to the operating conditions of turbomachine 10; it consists mainly in injecting a quantity of air towards a portion of casing 30, with a view to partly cooling casing 30 and reducing its expansion.

To accomplish this a quantity of air is taken from high-pressure compressor 12 and is directed towards casing 30 by channels and then injected on to outer face 34e of annular wall 34.

The redirected air is injected into a control unit 60 of casing 30, which is securely attached to annular wall 34.

Control unit 60 includes bosses 36 which are produced on outer face 34e of annular wall 34. Bosses 36 are formed to facilitate heat exchanges with the injected air.

Control unit 60 is multi-perforated, i.e. it contains multiple perforations traversed by the air to allow bosses 36 to be cooled by impact with the air.

Depending on the quantity of air which is injected on to bosses 36, casing 30 is cooled to a greater or lesser extent, and the amplitude of its expansion is controlled in this manner.

Ring sectors 28 are installed on wall 34 of casing 30, they therefore move radially strictly identically with the expansion or contraction of casing 30.

The air projected on to bosses 36 thus enables the radial position of ring sectors 28 to be modified relative to main axis A of turbomachine 10.

Each ring sector 28 is installed on control casing 30 through radial tabs 38, 40 which extend radially from annular wall 34 of control casing 30 as far as ring sector 28.

A first upstream radial tab 38 is located at upstream end 28a of each ring sector 28, in the flow direction of the gas stream, and a second downstream radial tab 40 is located at downstream end 28b of the ring sector 28.

Inner radial end 38a, 40a of each radial tab 38, 40 is attached to associated end 28a, 28b of ring sector 28, by conventional attachment means.

Each radial tab 38, 40 is produced as a single part with annular wall 34 of casing 30. Each radial tab 38, 40 is thus attached to annular wall 34 of casing 30 at its outer radial end 30b, 40b.

This enables the structure of casing 30 to be simplified since it contains no means of attaching radial tabs 38, 40 to the casing, which could make the installation complex or increase the mass of casing 30.

The main function of radially external portion of casing 30, which includes in particular annular wall 34 and bosses 36, is to control the clearance, whereas the radially internal portion of casing 30, which consists notably of internally radial ends 38a, 40a of radial tabs 38, 40, is subjected to major thermal stresses. Indeed, ring sectors 28 are in direct contact with hot gases and their temperature can reach approximately 800° C. Inner radial ends 38a, 40a of radial tabs 38, 40 must consequently withstand such temperatures.

According to the invention, each of radial tabs 38, 40 is made of two materials, where each material is appropriate for the way in which the casing is used.

A first portion of each radial tab 38, 40 is thus made of a first material which is resistant to high temperatures, and a second portion of each radial tab 38, 40 is made of a second material which has satisfactory thermal expansion properties.

According to another aspect of the invention annular wall 34 and bosses 36 of casing 30 are made of the same second material as the second portion of each radial tab 38, 40, which has satisfactory thermal expansion properties. This second portion of each radial tab 38, 40 can thus be produced as a single part, by casting, with annual wall 34 and bosses 36 of casing 30.

Each radial tab 38, 40 includes a radially internal portion 42 which is made from the first material and which supports ring sectors 28, and each radial tab 38, 40 includes a radially external portion 44 which is made from the second material.

Radially external portion 44 of each radial tab 38, 40 is made of the same material as annular wall 34 and bosses 36 of casing 30. Radially external portion 44 of each radial tab 38, 40 is thus made as a single part with annular wall 34 and bosses 36 of casing 30.

Radially internal portion 42 of each radial tab 38, 40 is coupled to radially external portion 44 of associated radial tab 38, 40 by welding.

Each radial tab 38, 40 is a rotationally symmetrical element centred around the main axis of the casing. Each portion 42, 44 of radial tab 38, 40 is also a rotationally symmetrical element and both portions 42, 44 are attached to one another by welding with a circular welding bead 46 on their respective edges in contact.

The method of welding of two portions 42, 44 is preferably a method of electron beam welding since it notably enables portions of relatively high thicknesses to be welded.

The first material, of which first radially internal portion 42 is made, is a heat-resistant material, i.e. it does not deteriorate under the effect of aggression due to heat, which can reach approximately 800° C.

According to one preferred embodiment the first material constituting first portion 42 of each radial tab 38, 40 is an alloy of aluminium and titanium known by the designation "C263".

The second material material constituting second portion 44 of each radial tab 38, 40 is therefore a material having high linear expansion properties, in order to optimise control of the clearance, whilst injecting a reduced quantity of air on bosses 36 of casing 30. This enables the impact of control of the clearance on the turbomachine's efficiency to be limited.

According to one preferred embodiment the second material constituting second portion 44 of each radial tab 38, 40 is an alloy made of nickel and chromium known by the designation "inconel 718".

In addition, the first material, i.e. "inconel 718", has, when cold, mechanical properties which are more advantageous than the second material (C263). Use of this material to form annular wall 34 and the bosses 36 of casing 30 also enables the lifetime of casing 30 to be increased.

The invention claimed is:

1. A casing of an aircraft turbine, configured to support a set of ring sectors which partly delimits a channel for the passage of a gas stream through the turbine,
    where the casing includes an adjustment device for dynamic adjustment of a radial position of the ring sectors by controlled injection of an air stream on to portions of an annular wall of the casing,
    where the casing includes an upstream radial tab which connects an upstream end of each ring sector, in a flow direction of the gas stream, to the casing, and a downstream radial tab which connects a downstream end of each ring sector to the casing, where both upstream and downstream radial tabs are made from a single piece with the casing,
    wherein each radial tab is made as two portions from different materials, and includes a radially internal portion made of a first material and a radially external portion made of a second material, and
    wherein the first material is a heat-resistant material, and the second material is a material with a high linear expansion coefficient.

2. A casing according to claim 1, wherein the annular wall of the casing is made from the second material.

3. A casing according to claim 1, wherein both portions of each radial tab are coupled to one another by welding.

4. A casing according to claim 3, wherein a welding bead of both portions of each radial tab is circular and coaxial with a main axis of the casing.

5. A casing according to claim 1, wherein the first material is an alloy of aluminium and titanium.

6. A casing according to claim 1, wherein the second material is an alloy made from nickel and chromium.

7. A turbine of an aircraft turbomachine comprising a stator assembly including the casing according to claim 1, and including multiple ring sectors which are attached directly at least to the upstream radial tab of the casing.

8. An aircraft turbomachine including the turbine according to claim 7.

* * * * *